(12) United States Patent
Ideta et al.

(10) Patent No.: US 11,655,326 B2
(45) Date of Patent: May 23, 2023

(54) MOLDED BODY CONTAINING POLYCARBONATE-POLYORGANOSILOXANE COPOLYMER

(71) Applicant: IDEMITSU KOSAN CO., LTD., Tokyo (JP)

(72) Inventors: Kazushige Ideta, Chiba (JP); Hirotoshi Ishii, Kisarazu (JP); Yasuhiro Ishikawa, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 151 days.

(21) Appl. No.: 16/955,996

(22) PCT Filed: Dec. 27, 2018

(86) PCT No.: PCT/JP2018/048369
§ 371 (c)(1),
(2) Date: Jun. 19, 2020

(87) PCT Pub. No.: WO2019/131969
PCT Pub. Date: Jul. 4, 2019

(65) Prior Publication Data
US 2020/0317846 A1    Oct. 8, 2020

(30) Foreign Application Priority Data
Dec. 28, 2017 (JP) .............................. JP2017-254795

(51) Int. Cl.
*C08F 293/00* (2006.01)

(52) U.S. Cl.
CPC .................. *C08F 293/00* (2013.01)

(58) Field of Classification Search
CPC ...... C08G 77/448; C08G 64/186; C08L 83/10
See application file for complete search history.

(56) References Cited

U.S. PATENT DOCUMENTS

| | | | |
|---|---|---|---|
| 5,380,795 A | 1/1995 | Gosens et al. | |
| 2008/0220900 A1* | 9/2008 | Komatsu | A63B 37/0003 473/383 |
| 2012/0288654 A1 | 11/2012 | Gallucci et al. | |
| 2015/0284564 A1* | 10/2015 | Yang | C08G 77/448 524/537 |
| 2016/0145927 A1* | 5/2016 | Hirakawa | B60J 10/273 296/1.04 |
| 2018/0251636 A1* | 9/2018 | Abe | C08G 64/24 |
| 2020/0407499 A1* | 12/2020 | Ideta | C08G 64/186 |

FOREIGN PATENT DOCUMENTS

| | | |
|---|---|---|
| CN | 102652149 A | 8/2012 |
| CN | 103534297 A | 1/2014 |
| JP | H06-279669 A | 10/1994 |
| JP | H07-258398 A | 10/1995 |
| JP | 2003-277574 A | 10/2003 |
| TW | 201714917 A | 5/2017 |
| WO | WO-2011/071128 A1 | 6/2011 |
| WO | WO-2014/157681 A1 | 10/2014 |
| WO | WO-2017/034039 A1 | 3/2017 |
| WO | WO-2017/034040 A1 | 3/2017 |

OTHER PUBLICATIONS

Nairn "Polymer Structure and Characterization" (Year: 2007).*
European Extended Search Report, dated Aug. 20, 2021, issued in corresponding European Patent Application No. 18894960.6, (5 pages).
International Searching Authority, "International Search Report," issued in connection with International Patent Application No. PCT/JP2018/048369, dated Apr. 2, 2019.
International Searching Authority, "Written Opinion," issued in connection with International Patent Application No. PCT/JP2018/048369, dated Apr. 2, 2019.
Office Action dated Jan. 18, 2022 issued in a corresponding Indian Patent Application No. 202047026708, (6 pages).
Office Action issued in corresponding Taiwanese Patent Application No. 107147831 dated Jul. 11, 2022.
First Office Action issued in corresponding Chinese Patent Application No. 201880083929.1 dated Apr. 20, 2022 (21 pages).
Office Action issued in corresponding Japanese Patent Application No. 2019-562486, dated Sep. 13, 2022.
Office Action issued in corresponding Chinese Patent Application No. 201880083929.1, dated Dec. 7, 2022.
Office Action issued in corresponding Taiwanese Patent Application No. 107147831, dated Mar. 29, 2023.

* cited by examiner

*Primary Examiner* — Mark S Kaucher
(74) *Attorney, Agent, or Firm* — Foley & Lardner LLP

(57) ABSTRACT

Provided is a molded body including a polycarbonate-polyorganosiloxane copolymer which contains a polycarbonate block (A-1) formed of a repeating unit having a specific structure and a polyorganosiloxane block (A-2) containing a repeating unit having a specific structure, and in which the content of the polyorganosiloxane block (A-2) is from 20 mass % or more to 70 mass % or less, wherein the molded body has a durometer hardness of from 25 or more to 72 or less measured with a type D durometer in conformity with JIS K 6253-3:2012.

9 Claims, No Drawings

MOLDED BODY CONTAINING POLYCARBONATE-POLYORGANOSILOXANE COPOLYMER

CROSS-REFERENCE TO RELATED APPLICATIONS

The present application claims priority under 37 U.S.C. § 371 to International Patent Application No. PCT/JP2018/048369, filed Dec. 27, 2018, which claims priority to and the benefit of Japanese Patent Application No. 2017-254795, filed on Dec. 28, 2017. The contents of these applications are hereby incorporated by reference in their entireties.

TECHNICAL FIELD

The present invention relates to a molded body that includes a polycarbonate-polyorganosiloxane copolymer, that has flexibility, and that is excellent in transparency.

BACKGROUND ART

Resin molded articles having flexibility, which can be used by being bonded to various shapes or by being deformed or processed in accordance with various designs, have been required as a lighting cover or an optical lens for a streetlight or the like. In such applications, transparency and mechanical characteristics are required in addition to flexibility.

Acrylic resin has been widely investigated as such resin because of its high transparency and optical characteristics (Patent Document 1). Although the acrylic resin is excellent in transparency and flexibility, the resin involves a drawback in that the resin is poor in mechanical strength, moldability, and handleability.

CITATION LIST

Patent Document

Patent Document 1: JP 2003-277574 A

SUMMARY OF INVENTION

Technical Problem

Polycarbonate-based resin is superior in mechanical strength and moldability to the acrylic resin, but tends to be inferior in flexibility thereto.

An object of the present invention is to provide a molded body that includes a polycarbonate-polyorganosiloxane copolymer, and that has both of excellent flexibility and transparency.

Solution to Problem

The inventors of the present invention have found that the incorporation of a polycarbonate-polyorganosiloxane copolymer (hereinafter sometimes abbreviated as "PC-POS copolymer") having a specific structural unit and satisfying a specific condition can provide a molded body having flexibility and having excellent transparency.

That is, the present invention relates to the following items [1] to [10].

[1] A molded body, comprising a polycarbonate-polyorganosiloxane copolymer (A) which contains a polycarbonate block (A-1) formed of a repeating unit represented by the following general formula (I) and a polyorganosiloxane block (A-2) containing a repeating unit represented by the following general formula (II), and in which a content of the polyorganosiloxane block (A-2) is from 20 mass % or more to 70 mass % or less, wherein the molded body has a durometer hardness of from 25 or more to 72 or less measured with a type D durometer in conformity with JIS K 6253-3:2012:

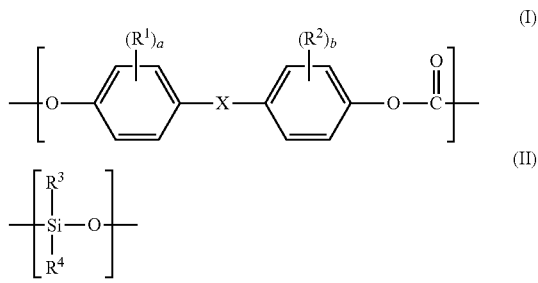

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

[2] The molded body according to the above-mentioned item [1], wherein a content of a unit represented by the following general formula (III) in the polyorganosiloxane block (A-2) is 0.1 mol % or less:

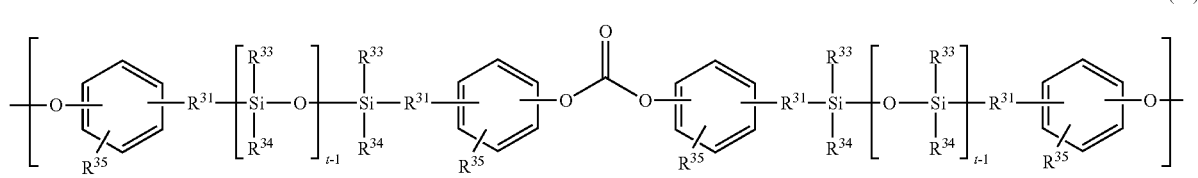

wherein $R^{33}$ and $R^{34}$ each independently represent a hydrogen atom, a halogen atom, an alkyl group having 1 to 6 carbon atoms, an alkoxy group having 1 to 6 carbon atoms, or an aryl group having 6 to 12 carbon atoms, $R^{31}$ represents an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, an arylene group having 6 to 12 carbon atoms, a fluorenediyl group, an arylalkylene group having 7 to 15 carbon atoms, or an arylalkylidene group having 7 to 15 carbon atoms, $R^{35}$ represents a hydrogen atom, a halogen atom, an alkyl group having 1 to 6 carbon atoms, an alkoxy group having 1 to 6 carbon atoms, or an aryl group having 6 to 12 carbon atoms, and "t" represents an average chain length of a polyorganosiloxane.

[3] The molded body according to the above-mentioned item [1] or [2], wherein the polyorganosiloxane block (A-2) has a number of repetitions of from 10 or more to less than 90.

[4] The molded body according to any one of the above-mentioned items [1] to [3], wherein the polyorganosiloxane block (A-2) contains a unit represented by at least one of the following general formula (II-I), (II-II), or (II-III):

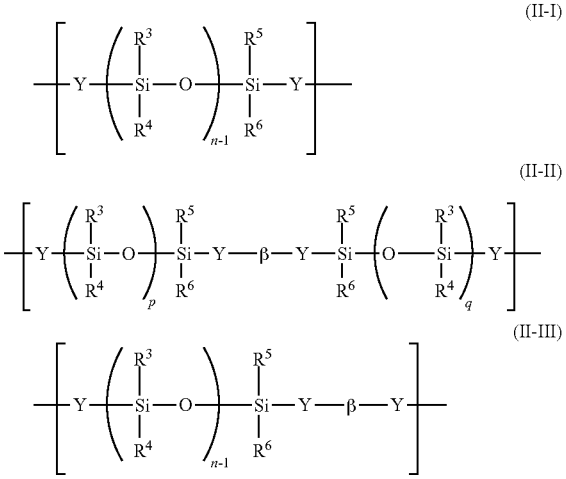

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$s, $R^4$s, $R^5$s, or $R^6$s may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Ys may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, "n" represents a chain length of a polyorganosiloxane, and n–1, and "p" and "q" each represent a number of repetitions of a polyorganosiloxane unit and each represent an integer of 1 or more, and a sum of "p" and "q" is n–2.

[5] The molded body according to any one of the above-mentioned items [1] to [4], wherein the polyorganosiloxane block (A-2) is represented by the following general formula (V):

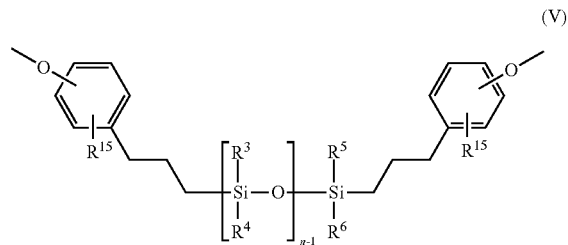

wherein $R^3$ to $R^6$ and n–1 are the same as those described in the general formulae (II-I) to (II-III), and $R^{15}$ represents a hydrogen atom, a halogen atom, an alkyl group having 1 to 6 carbon atoms, an alkoxy group having 1 to 6 carbon atoms, or an aryl group having 6 to 12 carbon atoms.

[6] The molded body according to any one of the above-mentioned items [1] to [5], wherein the polycarbonate-polyorganosiloxane copolymer (A) has a viscosity-average molecular weight of from 10,000 or more to 23,000 or less.

[7] The molded body according to any one of the above-mentioned items [1] to [6], wherein the polycarbonate-polyorganosiloxane copolymer (A) has a molecular weight distribution of from 2.1 or more to 3.9 or less.

[8] The molded body according to any one of the above-mentioned items [1] to [7], wherein the molded body has a total light transmittance of 75% or more measured in conformity with JIS K 7361-1:1997 when molded into a thickness of 2 mm.

[9] The molded body according to any one of the above-mentioned items [1] to [8], wherein the molded body is an optical member.

[10] The molded body according to any one of the above-mentioned items [1] to [8], wherein the molded body is at least one selected from a flexible display, a light guide plate, a housing, a water- or oil-repellent film, an optical adhesive, a switch cover, a heat sealing agent, a water stop material, a sealing agent, a connector, an adapter, a smartphone cover, a lens, a part for a pair of glasses or sunglasses, an optical fiber part, a cushion material for an on-vehicle battery, a wiper blade, a traffic mirror, a side mirror, a rearview mirror, a lamp cover, a bumper, a window, an exterior material, an interior material, an acoustic material, a steering wheel cover, a sensor cover, a watch part, stationery, a cosmetic container, an aquarium for rearing an aquatic organism, a sole, a cup, a nail art material, a toy, a lure, a suction cup, cooking tools including a steamer, clothes, a silicone wiping sheet, a remote controller cover, an umbrella, a metal container lining, a building material cover, a door, a window, a glass interlayer, a tent, a mirror, a shop window case, a plastic greenhouse, a medical equipment housing, a transfusion bag, a transfusion tube, an injection syringe, a feeding bottle, a mask, a face belt, a filter part, a damping part, a robot housing, a drone housing, a shield, a bulletproof shield, a sport cushion, a window for an aircraft, a resin compatibilizer, a lighting cover, a light guide, a light guide panel, a lighting unit, a prism panel, a flat lens, a Fresnel lens, a microlens array, and a collimator lens.

Advantageous Effects of Invention

According to the present invention, the molded body that includes a polycarbonate-polyorganosiloxane copolymer, and that has both of excellent flexibility and transparency can be obtained.

DESCRIPTION OF EMBODIMENTS

A molded body including a polycarbonate-polyorganosiloxane copolymer of the present invention is described in detail below. In this description, a specification considered to be preferred may be arbitrarily adopted, and it can be said that a combination of preferred specifications is more preferred. The term "XX to YY" as used herein means "from XX or more to YY or less."

A molded body of the present invention is characterized by comprising a polycarbonate-polyorganosiloxane copolymer (A) which contains a polycarbonate block (A-1) formed of a repeating unit represented by the following general formula (I) and a polyorganosiloxane block (A-2) containing a repeating unit represented by the following general formula (II), and in which a content of the polyorganosiloxane block (A-2) is from 20 mass % or more to 70 mass % or less, wherein the molded body has a durometer hardness of from 25 or more to 72 or less measured with a type D durometer in conformity with JIS K 6253-3:2012:

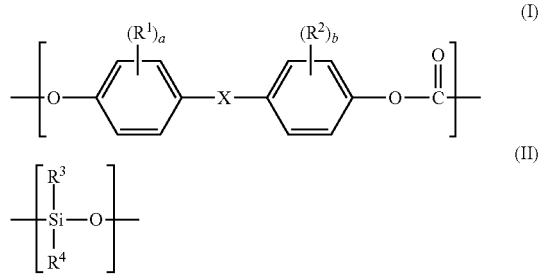

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

The polycarbonate-polyorganosiloxane copolymer (A) in the molded body of the present invention is described below. The polycarbonate block (A-1) represented by the general formula (I) is described in detail first. In the general formula (I), examples of the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and all kinds of branched groups are included, and the same holds true for the following), various pentyl groups, and various hexyl groups. Examples of the alkoxy group that $R^1$ and $R^2$ each independently represent include alkoxy groups having the above-mentioned alkyl groups as alkyl group moieties.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the arylene group represented by X include a phenylene group, a naphthylene group, and a biphenylene group. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred. Examples of the aryl moiety of the arylalkylene group represented by X include aryl groups each having 6 to 14 ring-forming carbon atoms, such as a phenyl group, a naphthyl group, a biphenyl group, and an anthryl group. Examples of the aryl moiety of the arylalkylidene group represented by X include aryl groups each having 6 to 14 ring-forming carbon atoms, such as a phenyl group, a naphthyl group, a biphenyl group, and an anthryl group.

"a" and "b" each independently represent an integer of from 0 to 4, preferably from 0 to 2, more preferably 0 or 1.

Among them, a block in which "a" and "b" each represent 0, and X represents a single bond or an alkylene group having 1 to 8 carbon atoms, or a block in which "a" and "b" each represent 0, and X represents an alkylidene group, in particular an isopropylidene group is suitable. The copolymer may contain a plurality of kinds of polycarbonate blocks as the polycarbonate blocks (A-1).

When the copolymer contains the plurality of kinds of polycarbonate blocks as the polycarbonate blocks (A-1), the content of a block in which "a" and "b" each represent 0, and X represents an isopropylidene group is preferably 90 mass % or more, more preferably 90.9 mass % or more, still more preferably 93.3 mass % or more, particularly preferably 95 mass % or more, most preferably 100 mass % from the viewpoint of the transparency of the molded body.

Next, the polyorganosiloxane block (A-2) represented by the general formula (II) is described in detail.

In the general formula (II), examples of the halogen atom that $R^3$ and $R^4$ each independently represent include a fluorine atom, a chlorine atom, a bromine atom, and an iodine atom. Examples of the alkyl group that $R^3$ and $R^4$ each independently represent include a methyl group, an ethyl group, a n-propyl group, an isopropyl group, various butyl groups, various pentyl groups, and various hexyl groups. Examples of the alkoxy group that $R^3$ and $R^4$ each independently represent include alkoxy groups having the above-mentioned alkyl groups as alkyl group moieties. Examples of the aryl group that $R^3$ and $R^4$ each independently represent include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

The polyorganosiloxane block containing the repeating unit represented by the general formula (II) preferably has a unit represented by any one of the following general formulae (II-I), (II-II) or (II-III):

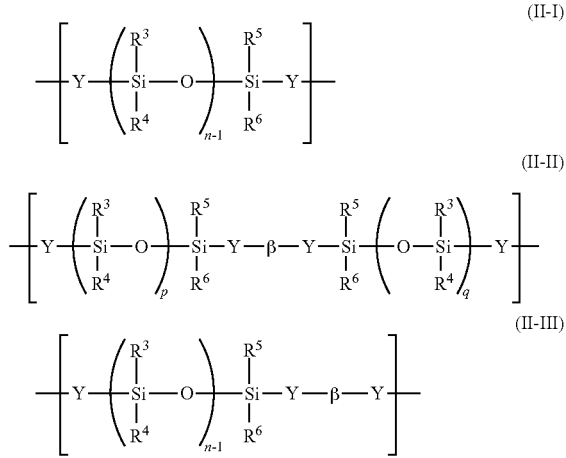

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$s, $R^4$s, $R^5$s, or $R^6$s may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Ys may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, "n" represents the average chain length of a polyorganosiloxane, and n–1, and "p" and "q" each represent the number of repetitions of a polyorganosiloxane unit and each represent an integer of 1 or more, and the sum of "p" and "q" is n–2.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. Examples of the alkoxy group that $R^3$ to $R^6$ each independently represent include alkoxy groups having the above-mentioned alkyl groups as alkyl group moieties. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

$R^3$ to $R^6$ in the general formula (II-I), the general formula (II-II), and/or the general formula (II-III) each preferably represent a methyl group.

The linear or branched alkylene group represented by $R^7$ in —$R^7$O—, —$R^7$COO—, —$R^7$NH—, —$R^7$NR$^8$—, —$R^7$COO—$R^9$—O—, or —$R^7$O—$R^{10}$—O— represented by Y is, for example, an alkylene group having 1 to 8 carbon atoms, preferably 1 to 5 carbon atoms, and the cyclic alkylene group represented by $R^7$ is, for example, a cycloalkylene group having 5 to 15 carbon atoms, preferably 5 to 10 carbon atoms.

The aryl-substituted alkylene group represented by $R^7$ may have a substituent, such as an alkoxy group or an alkyl group, on its aromatic ring, and a specific structure thereof may be, for example, a structure represented by the following general formula (i) or (ii). When the block has the aryl-substituted alkylene group, the alkylene group is bonded to Si.

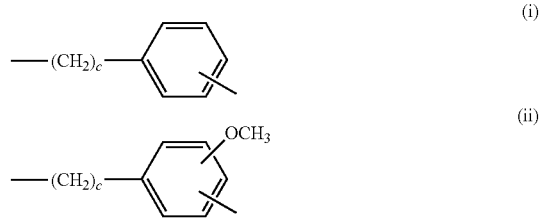

wherein "c" represents a positive integer and typically represents an integer of from 1 to 6.

The diarylene group represented by any one of $R^7$, $R^9$, and $R^{10}$ refers to a group in which two arylene groups are linked to each other directly or through a divalent organic group, and is specifically a group having a structure represented by —Ar$^1$—W—Ar$^2$—. Ar$^1$ and Ar$^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by any one of $R^7$, Ar$^1$, and Ar$^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched group having 1 to 8, preferably 1 to 5 carbon atoms. The alkenyl group represented by $R^8$ is, for example, a linear or branched group having 2 to 8, preferably 2 to 5 carbon atoms. The aryl group represented by $R^8$ is, for example, a phenyl group or a naphthyl group. The aralkyl group represented by $R^8$ is, for example, a phenylmethyl group or a phenylethyl group.

The linear, branched, or cyclic alkylene group represented by $R^{10}$ is the same as that represented by $R^7$.

Y preferably represents —$R^7$O—. $R^7$ preferably represents an aryl-substituted alkylene group, in particular, a residue of a phenol-based compound having an alkyl group, and more preferably represents an organic residue derived from allylphenol or an organic residue derived from eugenol.

With regard to "p" and "q" in the formula (II-II), it is preferred that p=q.

β represents a divalent group derived from a diisocyanate compound, or a divalent group derived from a dicarboxylic acid or a halide of a dicarboxylic acid, and examples thereof include divalent groups represented by the following general formulae (iii) to (vii).

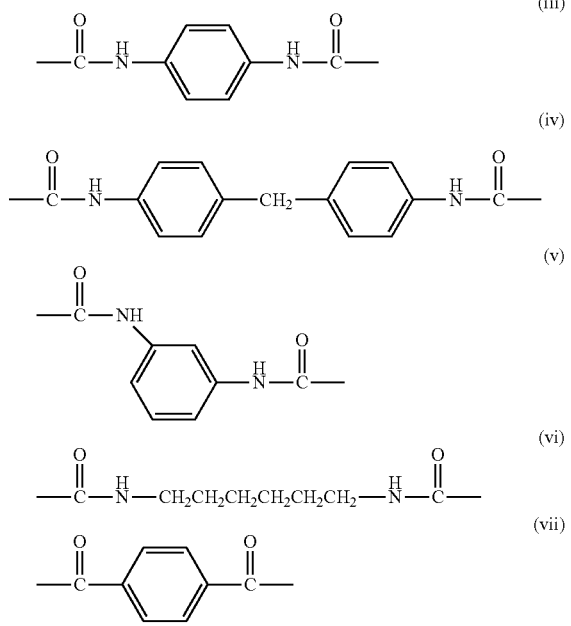

It is more preferred that the PC-POS copolymer (A) in the molded body of the present invention contain the polyorganosiloxane block (A-2) represented by the following structural formula:

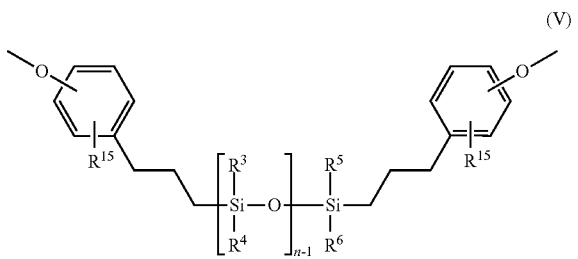

wherein $R^3$ to $R^6$ and "n" are the same as those described in the general formulae (II-I) to (II-III), and $R^{15}$ represents a hydrogen atom, a halogen atom, an alkyl group having 1 to 6 carbon atoms, an alkoxy group having 1 to 6 carbon atoms, or an aryl group having 6 to 12 carbon atoms.

The number of repetitions of the polyorganosiloxane block (A-2) in the PC-POS copolymer is preferably from 10 or more to less than 90. More specifically, the number of repetitions is preferably 10 or more, more preferably 15 or more, particularly preferably 20 or more, and is preferably less than 90, more preferably 80 or less, still more preferably 60 or less, still further more preferably 45 or less, still further more preferably 40 or less, particularly preferably less than 40. The number of repetitions is calculated by nuclear magnetic resonance (NMR) measurement. When the number of repetitions of the polyorganosiloxane block (A-2) is set within the range, both of excellent transparency and flexibility can be achieved, and peeling after the production of the molded body can be suppressed.

The content of the polyorganosiloxane block (A-2) in the PC-POS copolymer (A) in the molded body of the present invention needs to be from 20 mass % or more to 70 mass % or less. When the content of the polyorganosiloxane block (A-2) in the PC-POS copolymer is 20 mass % or more, a copolymer excellent in flexibility can be obtained. When the content of the polyorganosiloxane block (A-2) is 70 mass % or less, a copolymer that is free of any remarkable tackiness, and that can maintain a shape as a flexible molded body is obtained.

The content of the polyorganosiloxane block (A-2) in the PC-POS copolymer (A) in the molded body of the present invention is preferably 30 mass % or more, more preferably 40 mass % or more, still more preferably 45 mass % or more, and is preferably 65 mass % or less, more preferably 60 mass % or less, still more preferably 55 mass % or less.

The viscosity-average molecular weight of the PC-POS copolymer in the molded body of the present invention is preferably from 10,000 or more to 23,000 or less. The viscosity-average molecular weight (Mv) may be adjusted by using a molecular weight modifier (terminal stopper) or the like, or by a reaction condition. The viscosity-average molecular weight is preferably set within the range because a copolymer excellent in moldability is obtained, and hence the melt fracture of the molded body can be further suppressed.

The viscosity-average molecular weight (Mv) is more preferably 12,000 or more, still more preferably 14,000 or more, still further more preferably 16,000 or more, and is more preferably 21,500 or less, still more preferably 20,500 or less, still further more preferably 19,500 or less, still further more preferably 18,500 or less, particularly preferably 18,000 or less. When the viscosity-average molecular weight is 10,000 or more, a sufficient molded article strength can be obtained.

The viscosity-average molecular weight (Mv) is a value calculated from the following Schnell's equation by measuring the limiting viscosity $[\eta]$ of a methylene chloride solution at 20° C.

$$[\eta]=1.23\times10^{-5}\times mv^{0.83}$$

The weight-average molecular weight (Mw) of the PC-POS copolymer of the present invention is preferably 40,000 or less. When the weight-average molecular weight (Mw) falls within the range, a PC-POS copolymer excellent in flexibility can be obtained. The weight-average molecular weight (Mw) of the PC-POS copolymer is more preferably 37,000 or less, still more preferably 35,000 or less, still further more preferably 30,000 or less. In addition, the weight-average molecular weight (Mw) is preferably 20,000 or more, more preferably 23,000 or more.

Further, the molecular weight distribution (Mw/Mn) of the PC-POS copolymer (A) in the molded body of the present invention is preferably from 2.1 or more to 3.9 or less. The molecular weight distribution Mw/Mn of the PC-POS copolymer preferably falls within the range because nonuniformity due to an irregular flow or a phase separation is suppressed at the time of the molding of the copolymer, and hence a molded body that has high transparency, and that is easily controlled in flexibility is obtained.

The molecular weight distribution Mw/Mn of the PC-POS copolymer (A) is more preferably 2.3 or more, still more preferably 2.4 or more, still further more preferably 2.5 or more, still further more preferably 2.7 or more, particularly preferably 2.8 or more, and is more preferably 3.5 or less, still more preferably 3.0 or less, particularly preferably 2.9 or less.

The PC-POS copolymer (A) may be produced by a known production method, such as an interfacial polymerization method (phosgene method), a pyridine method, or an ester exchange method. In particular, the interfacial polymerization method including adding a polyorganosiloxane to a reaction system in which a dihydric phenol and a carbonate precursor are polymerized to copolymerize the materials is preferably adopted because of the following reason: a step of separating an organic phase containing the PC-POS copolymer and an aqueous phase containing an unreacted product, a catalyst residue, or the like becomes easier, and hence the separation of the organic phase containing the PC-POS copolymer and the aqueous phase in each washing step based on alkali washing, acid washing, or pure water (ion-exchanged water) washing becomes easier, thereby efficiently providing the PC-POS copolymer. With regard to a method of producing the PC-POS copolymer, reference may be made to, for example, a method described in JP 2014-80462 A.

Specifically, the PC-POS copolymer may be produced by: dissolving a polycarbonate oligomer produced in advance to be described later and a polyorganosiloxane in a water-insoluble organic solvent (e.g., methylene chloride); adding a solution of a dihydric phenol-based compound (e.g., bisphenol A) in an aqueous alkali compound (e.g., aqueous sodium hydroxide) to the solution; and subjecting the mixture to an interfacial polycondensation reaction through the use of a tertiary amine (e.g., triethylamine) or a quaternary ammonium salt (e.g., trimethylbenzylammonium chloride) as a polymerization catalyst in the presence of a terminal stopper (a monohydric phenol, such as p-tert-butylphenol). In addition, the PC-POS copolymer may also be produced by copolymerizing the polyorganosiloxane and a dihydric phenol, and phosgene, a carbonate ester, or a chloroformate.

When the PC-POS copolymer (A) in the molded body of the present invention is produced by, for example, causing a polycarbonate oligomer and a polyorganosiloxane raw material to react with each other in an organic solvent, and then causing the resultant to react with a dihydric phenol, the solid content weight (g/L) of the polycarbonate oligomer in 1 L of a mixed solution of the organic solvent and the polycarbonate oligomer preferably falls within the range of 200 g/L or less from the viewpoint of the transparency of the PC-POS copolymer to be obtained. The solid content weight is more preferably 180 g/L or less, still more preferably 170 g/L or less.

The transparency of the copolymer to be obtained becomes more satisfactory as the solid content weight (g/L) of the polycarbonate oligomer in 1 L of the mixed solution of the organic solvent and the polycarbonate oligomer reduces. Accordingly, the lower limit of the solid content weight is not particularly limited. However, from the viewpoint of efficiently producing the PC-POS copolymer, the solid content weight is preferably 20 g/L or more, more preferably 30 g/L or more, still more preferably 40 g/L or more.

A polyorganosiloxane represented by the following general formula (1), general formula (2), and/or general formula (3) may be used as the polyorganosiloxane serving as a raw material:

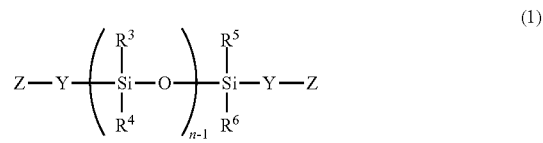

(1)

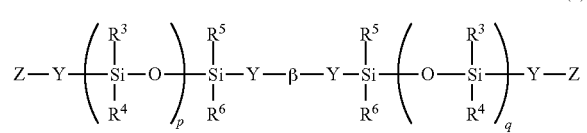

(2)

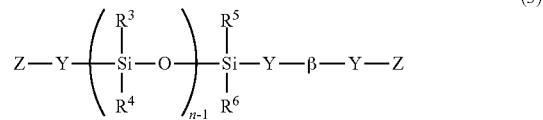

(3)

wherein
$R^3$ to $R^6$, Y, β, n–1, "p", and "q" are as described above, and specific examples and preferred examples thereof are also the same as those described above, and Z represents a hydrogen atom or a halogen atom, and a plurality of Zs may be identical to or different from each other.

Examples of the polyorganosiloxane represented by the general formula (1) include compounds each represented by any one of the following general formulae (1-1) to (1-11):

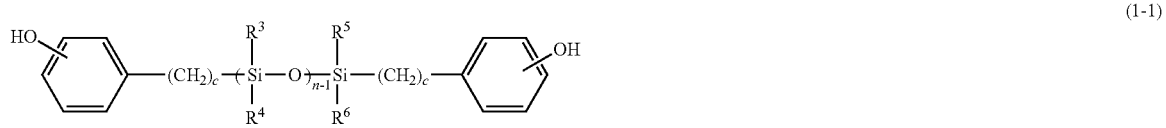

(1-1)

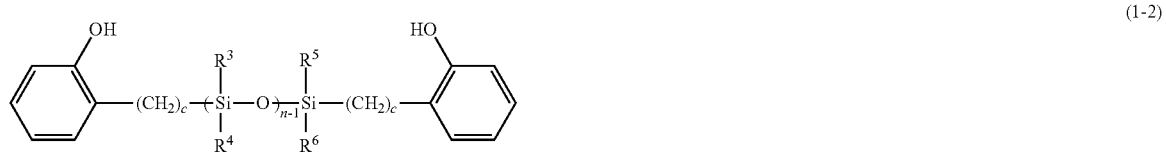

(1-2)

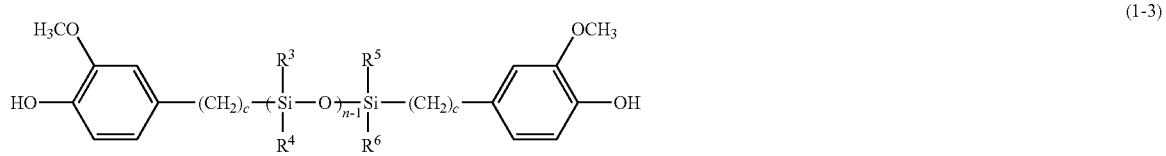

(1-3)

-continued

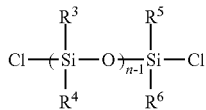
(1-4)

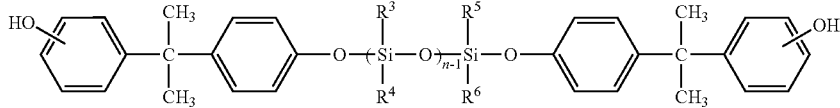
(1-5)

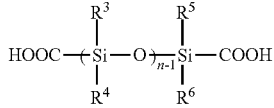
(1-6)

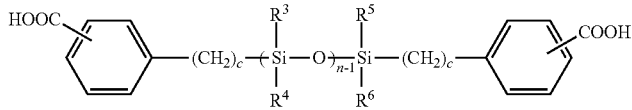
(1-7)

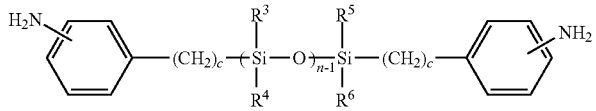
(1-8)

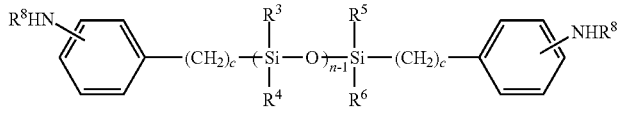
(1-9)

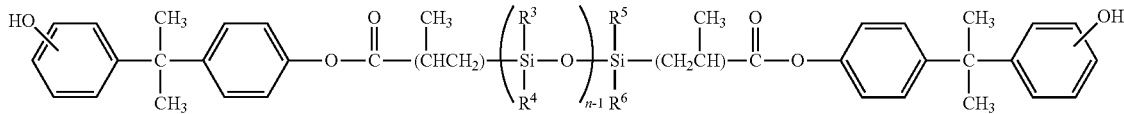
(1-10)

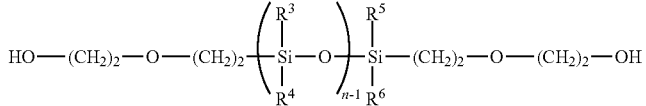
(1-11)

wherein in the general formulae (1-1) to (1-11), $R^3$ to $R^6$, "n", and $R^8$ are as defined above, and preferred examples thereof are also the same as those described above, and "c" represents a positive integer and typically represents an integer of from 1 to 6.

Among them, a phenol-modified polyorganosiloxane represented by the general formula (1-1) is preferred from the viewpoint of its ease of polymerization. An α,ω-bis[3-(o-hydroxyphenyl)propyl]polydimethylsiloxane, which is one compound represented by the general formula (1-2), or an α,ω-bis[3-(4-hydroxy-3-methoxyphenyl)propyl]polydimethylsiloxane, which is one compound represented by the general formula (1-3), is preferred from the viewpoint of its ease of availability.

In addition to the foregoing, a compound having a structure represented by the following general formula (4) may be used as a polyorganosiloxane raw material:

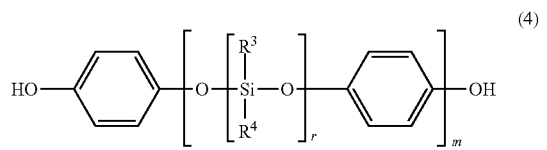
(4)

wherein $R^3$ and $R^4$ are identical to those described above. The average chain length of the polyorganosiloxane block represented by the general formula (4) is (r×m), and the range of the (r×m) is the same as that of the "n".

When the compound represented by the general formula (4) is used as a polyorganosiloxane raw material, the polyorganosiloxane block (A-2) preferably has a unit represented by the following general formula (II-IV):

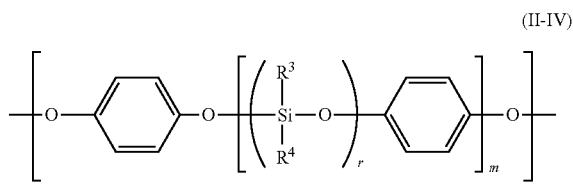

wherein $R^3$, $R^4$, "r", and "m" are as described above.

The copolymer may include a structure represented by the following general formula (II-V) as the polyorganosiloxane block (A-2):

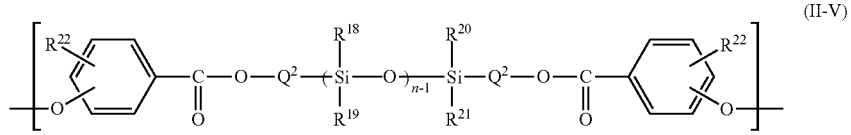

wherein $R^{18}$ to $R^{21}$ each independently represent a hydrogen atom or an alkyl group having 1 to 13 carbon atoms, $R^{22}$ represents an alkyl group having 1 to 6 carbon atoms, a hydrogen atom, a halogen atom, a hydroxy group, an alkoxy group having 1 to 6 carbon atoms, or an aryl group having 6 to 14 carbon atoms, $Q^2$ represents a divalent aliphatic group having 1 to 10 carbon atoms, and n−1 represents the number of repetitions of the polyorganosiloxane block, and its range is as described above.

In the general formula (II-V), examples of the alkyl group having 1 to 13 carbon atoms that $R^{18}$ to $R^{21}$ each independently represent include a methyl group, an ethyl group, a n-propyl group, an isopropyl group, various butyl groups, various pentyl groups, various hexyl groups, various heptyl groups, various octyl groups, a 2-ethylhexyl group, various nonyl groups, various decyl groups, various undecyl groups, various dodecyl groups, and various tridecyl groups. Among them, $R^{18}$ to $R^{21}$ each preferably represent a hydrogen atom or an alkyl group having 1 to 6 carbon atoms, and it is more preferred that all of $R^{18}$ to $R^{21}$ each represent a methyl group.

Examples of the alkyl group having 1 to 6 carbon atoms represented by $R^{22}$ include a methyl group, an ethyl group, a n-propyl group, an isopropyl group, various butyl groups, various pentyl groups, and various hexyl groups. Examples of the halogen atom represented by $R^{22}$ include a fluorine atom, a chlorine atom, a bromine atom, and an iodine atom. An example of the alkoxy group having 1 to 6 carbon atoms represented by $R^{22}$ is an alkoxy group whose alkyl group moiety is the alkyl group described above. Examples of the aryl group having 6 to 14 carbon atoms represented by $R^{22}$ include a phenyl group, a toluyl group, a dimethylphenyl group, and a naphthyl group.

Among them, $R^{22}$ preferably represents a hydrogen atom or an alkoxy group having 1 to 6 carbon atoms, more preferably represents a hydrogen atom or an alkoxy group having 1 to 3 carbon atoms, and still more preferably represents a hydrogen atom.

The divalent aliphatic group having 1 to 10 carbon atoms represented by $Q^2$ is preferably a linear or branched divalent saturated aliphatic group having 1 to 10 carbon atoms. The number of carbon atoms of the saturated aliphatic group is preferably from 1 to 8, more preferably from 2 to 6, still more preferably from 3 to 6, still further more preferably from 4 to 6. The number of repetitions n−1 is as described above.

A preferred mode of the constituent unit (II-V) may be, for example, a structure represented by the following general formula (II-VI):

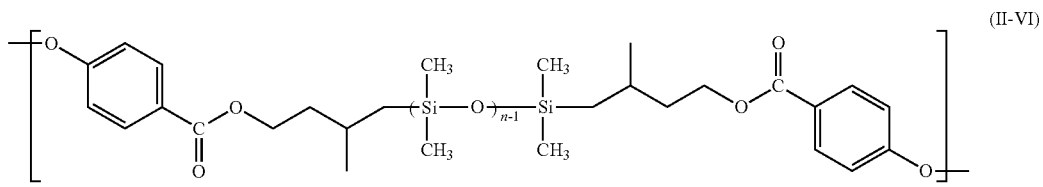

wherein n−1 is identical to that described above.

The polyorganosiloxane block (A-2) represented by the general formula (II-V) or (II-VI) may be obtained by using a polyorganosiloxane raw material represented by the following general formula (5) or (6):

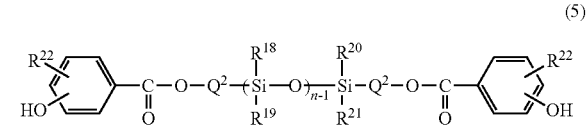

wherein $R^{18}$ to $R^{22}$, $Q^2$, and n-1 are as described above;

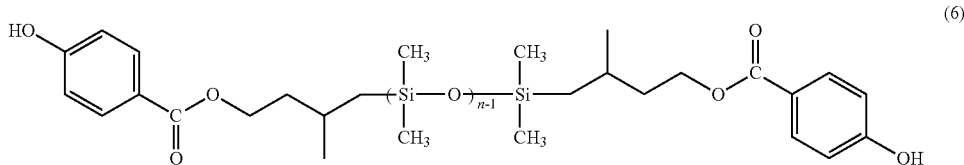

wherein n-1 is as described above.

A method of producing the polyorganosiloxane is not particularly limited. According to, for example, a method described in JP 11-217390 A, a crude polyorganosiloxane may be obtained by: causing cyclotrisiloxane and disiloxane to react with each other in the presence of an acid catalyst to synthesize α, ω dihydrogen organopentasiloxane; and then subjecting the α,ω-dihydrogen organopentasiloxane to an addition reaction with, for example, a phenolic compound (e.g., 2-allylphenol, 4-allylphenol, eugenol, or 2-propenylphenol) in the presence of a catalyst for a hydrosilylation reaction. According to a method described in JP 2662310 B2, the crude polyorganosiloxane may be obtained by: causing octamethylcyclotetrasiloxane and tetramethyldisiloxane to react with each other in the presence of sulfuric acid (acid catalyst); and subjecting the resultant α,ω-dihydrogen organopolysiloxane to an addition reaction with the phenolic compound or the like in the presence of the catalyst for a hydrosilylation reaction in the same manner as that described above. The α,ω-dihydrogen organopolysiloxane may be used after its chain length "n" has been appropriately adjusted in accordance with its polymerization conditions, or a commercial α,ω dihydrogen organopolysiloxane may be used. A catalyst described in JP 2016-098292 A may be specifically used as the hydrosilylation catalyst.

The polycarbonate oligomer may be produced by a reaction between a dihydric phenol and a carbonate precursor, such as phosgene or triphosgene, in an organic solvent, such as methylene chloride, chlorobenzene, or chloroform. When the polycarbonate oligomer is produced by using an ester exchange method, the oligomer may be produced by a reaction between the dihydric phenol and a carbonate precursor, such as diphenyl carbonate.

A dihydric phenol represented by the following general formula (viii) is preferably used as the dihydric phenol:

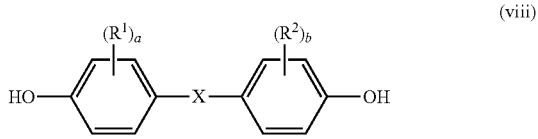

wherein $R^1$, $R^2$, "a", "b", and X are as described above.

Examples of the dihydric phenol represented by the general formula (viii) include: bis(hydroxyphenyl)alkane-based dihydric phenols, such as 2,2-bis(4-hydroxyphenyl) propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; and bis(4-hydroxyphenyl) ketone. Those dihydric phenols may be used alone or as a mixture thereof.

Among them, bis(hydroxyphenyl)alkane-based dihydric phenols are preferred, and bisphenol A is more preferred. When bisphenol A is used as the dihydric phenol, the PC-POS copolymer is such that in the general formula (i), X represents an isopropylidene group and a=b=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiaryl fluorenes, and dihydroxydiaryl adamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl) propane, and 2,2-bis(4-hydroxy-3,5-dibromophenyl) propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of dihydric phenols except those described above include 4,4'-[1,3-phenylenebis(1-methylethylidene)] bisphenol, 10,10-bis(4-hydroxyphenyl)-9-anthrone, and 1,5-bis(4-hydroxyphenylthio)-2,3-dioxapentane.

In order to adjust the molecular weight of the PC-POS copolymer to be obtained, a terminal stopper (molecular weight modifier) may be used. Examples of the terminal stopper may include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

After the interfacial polycondensation reaction, the PC-POS copolymer (A) in the molded body of the present invention may be obtained by appropriately leaving the resultant at rest to separate the resultant into an aqueous phase and an organic solvent phase [separating step], washing the organic solvent phase (preferably washing the phase with a basic aqueous solution, an acidic aqueous solution, and water in the stated order) [washing step], concentrating the resultant organic phase [concentrating step], and drying the concentrated phase [drying step].

In the PC-POS copolymer (A) in the molded body of the present invention, the content of a unit represented by the following general formula (III) in the polyorganosiloxane block (A-2) is preferably 0.1 mol % or less:

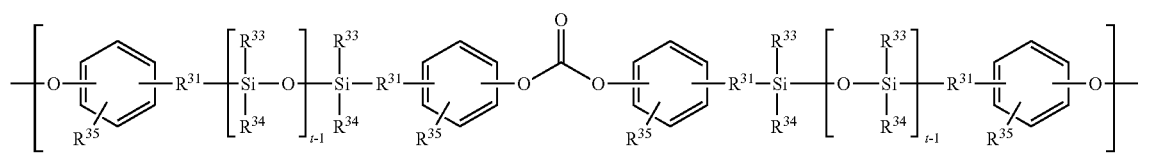

(III)

wherein $R^{33}$ and $R^{34}$ each independently represent a hydrogen atom, a halogen atom, an alkyl group having 1 to 6 carbon atoms, an alkoxy group having 1 to 6 carbon atoms, or an aryl group having 6 to 12 carbon atoms, $R^{31}$ represents an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, an arylene group having 6 to 12 carbon atoms, a fluorenediyl group, an arylalkylene group having 7 to 15 carbon atoms, or an arylalkylidene group having 7 to 15 carbon atoms, $R^{35}$ represents a hydrogen atom, a halogen atom, an alkyl group having 1 to 6 carbon atoms, an alkoxy group having 1 to 6 carbon atoms, or an aryl group having 6 to 12 carbon atoms, and "t" represents the average chain length of a polyorganosiloxane.

When the content of the block represented by the general formula (III) is 0.1 mol % or less, precise control between the raw material polyorganosiloxane to be used at the time of the production of the PC-POS copolymer and the chain length of the copolymer can be performed, and hence a target molded body having both of high flexibility and transparency can be obtained.

Specifically, the PC-POS copolymer in which the content of the block represented by the general formula (III) is 0.1 mol % or less can be obtained by adopting the above-mentioned interfacial polymerization method. The block represented by the general formula (III) may not be theoretically incorporated into the PC-POS copolymer (A) in the molded body of the present invention in terms of synthesis procedure, and hence its content is substantially 0.0 mol %.

A method of quantifying the content is described in detail. The content of the block represented by the general formula (III) in the PC-POS copolymer (A) is quantified by a peak in $^{13}$C-NMR. A specific quantification method is described in Examples. The quantification lower limit of the quantification method is calculated to be less than 0.1 mol % by the baseline SN ratio of a $^{13}$C-NMR chart. The semi-quantification of a region below 0.1 mol % is possible, though the quantification thereof is impossible. At the time of the semi-quantification, relative comparison between the heights of peaks corresponding to the general formula (III) is performed. When the relative comparison between the peak heights is difficult, the lower limit that can be semi-quantified can be further lowered by further increasing the number of scans to increase the SN ratio.

The content of the block represented by the general formula (III) in the PC-POS copolymer (A) in the molded body of the present invention, the content being specified by the quantification method or the semi-quantification method described in the foregoing, is more preferably 0.08 mol % or less, still more preferably 0.05 mol % or less, particularly preferably substantially 0.0 mol %.

In a conventionally known synthesis method, a polymerization-active phosgene gas is caused to react with a mixture of a bisphenol monomer and a polyorganosiloxane monomer, or with a polyorganosiloxane. Accordingly, even when the amount of the block represented by the general formula (III) is reduced by improving a method of adding the phosgene gas and the time period of contact between the gas and the mixture or the polyorganosiloxane, contact between a plurality of polyorganosiloxane monomer molecules and the polymerization-active phosgene gas is inevitable, and hence it is impossible to set the amount of the block represented by the general formula (III) to substantially 0.0 mol %.

Meanwhile, in the method of synthesizing the PC-POS copolymer in the molded body of the present invention, a bisphenol monomer and a phosgene gas are caused to react with each other in advance to synthesize a bisphenol monomer or a bisphenol polycarbonate oligomer both terminals of which are chloroformate structures, and a polymerization-inactive polyorganosiloxane monomer is, or the polymerization-inactive polyorganosiloxane monomer and a polymerization-inactive bisphenol monomer are, caused to react with the bisphenol monomer having polymerization-active chloroformate groups at both of its terminals or the bisphenol polycarbonate oligomer having polymerization-active chloroformate groups at both of its terminals. Accordingly, the block represented by the general formula (III) may be substantially free from being produced.

A raw material pellet may be obtained by melt-kneading the PC-POS copolymer to be obtained. At that time, any other additive may be added at the time of the preparation of the raw material pellet to the extent that the effects of the present invention are not impaired. Examples of the other additive may include an antioxidant, a UV absorber, a release agent, a reinforcing material, a filler, an elastomer for an impact resistance improvement, a dye, a pigment, an antistatic agent, and other resins except the polycarbonate, and the addition amount may also be appropriately selected at an appropriate ratio.

The melt-kneading may be performed by a method involving premixing with a typically used apparatus, such as a ribbon blender or a drum tumbler, and using, for example, a Henschel mixer, a Banbury mixer, a single-screw extruder, a twin-screw extruder, a multi-screw extruder, or a Ko-kneader. In normal cases, a heating temperature at the time of the kneading is appropriately selected from the range of from 240° C. or more to 320° C. or less. An extruder, in particular, a vented extruder is preferably used in the melt-kneading.

<Molded Body>

The molded body of the present invention may be produced by any one of, for example, an injection molding method, an injection compression molding method, an extrusion molding method, a blow molding method, a press molding method, a vacuum molding method, and an expansion molding method through the use of the melt-kneaded polycarbonate-polyorganosiloxane copolymer or the resultant pellet described above as a raw material. In particular, the molded body of the present invention is preferably a molded body obtained by using the pellet of the PC-POS copolymer (A) obtained through the melt-kneading.

The molded body of the present invention is characterized by having both of excellent flexibility and transparency. The respective properties are described in detail.

The flexibility is described in detail. The durometer hardness of the molded body of the present invention measured with a type D durometer in conformity with JIS K 6253-3:2012 by a method described in Examples needs to be from 25 or more to 72 or less.

The durometer hardness is an indicator representing an indentation hardness. To obtain a molded body having high flexibility while maintaining some degree of mechanical strength, the type D durometer hardness needs to fall within the above-mentioned range. The molded body of the present invention including the specific PC-POS copolymer (A) is excellent in flexibility, and hence can, for example, be used as a lighting cover without through any packing member and correspond to a light guide having a complicated shape. Accordingly, ease of construction can be drastically improved. Further, even in the case of an optical member having a void structure having an undercut draft angle therein, the molded body and the optical member can be integrally molded without the performance of any internal cutting step, and hence the molded body can be suitably used in a collimator lens. The molded body is excellent in transparency and flexibility, and hence may be suitably used in, for example, the following materials: household electric appliance-related materials, such as a substrate, a light guide plate, or a housing for a flexible display, a water- or oil-repellent film, an optical adhesive, a switch cover, a heat sealing agent, a water stop material, a sealing agent, a connector, an adapter, and a smartphone cover; materials for optical applications, such as a lens, a part for a pair of glasses or sunglasses, and an optical fiber part; automobile-related materials, such as a cushion material for an on-vehicle battery, a wiper blade, a traffic mirror, a side mirror, a rearview mirror, a lamp cover, a bumper, a window, a glass interlayer, an exterior material, an interior material, an acoustic material, a steering wheel cover, and a sensor cover; commodities, such as a watch part, stationery, a cosmetic container, an aquarium for rearing an aquatic organism, a sole, a cup, a nail art material, a toy, a lure, a suction cup, cooking tools including a steamer, clothes, a silicone wiping sheet, a remote controller cover, an umbrella, and a metal container lining; building-related materials, such as a building material cover, a door, a window, a glass interlayer, a tent, a mirror, a shop window case, and a plastic greenhouse; medical materials, such as a medical equipment housing, a transfusion bag, a transfusion tube, an injection syringe, a feeding bottle, a mask, a face belt, and a filter part; and other materials, such as a damping part, a robot housing, a drone housing, a shield, a bulletproof shield, a sport cushion, a window for an aircraft, and a resin compatibilizer.

The durometer hardness of the molded body of the present invention measured with a type D durometer is more preferably 30 or more, still more preferably 40 or more, and is more preferably 70 or less, still more preferably 68 or less.

The preferred range of the durometer hardness may vary depending on an application where the molded body of the present application is used. For example, when the molded body is used in an application where emphasis is placed on flexibility, the hardness is more preferably 28 or more, and is more preferably 33 or less. When the molded body is used in an application where emphasis is placed on a mechanical strength, the hardness is more preferably 60 or more, and is more preferably 65 or less. In addition to the foregoing, when the molded body is used in an application where emphasis is placed on both of the flexibility and the mechanical strength, the hardness is more preferably 45 or more, and is more preferably 50 or less.

The durometer hardness of the molded body cannot be measured in some cases depending on the shape thereof. In any such case, however, the durometer hardness can be measured by: melting the molded body once; and molding the molten product into a shape whose durometer hardness can be measured again. Molding conditions in the case are the same as those of a molding method described in Examples.

A product obtained by, for example, cutting, decomposing, or breaking any one of such molded body and a member including the molded body may be used as a raw material for obtaining the molded body.

The transparency is described in detail. It is preferred that the molded body of the present invention have a total light transmittance of 75% or more measured in conformity with JIS K 7361-1:1997 when molded into a thickness of 2 mm. When the total light transmittance under the condition is 75% or more, the molded body is excellent in transparency, and hence can be suitably used as the above-mentioned optical transparent member.

The total light transmittance of the molded body of the present invention when molded into a thickness of 2 mm is more preferably 85% or more, still more preferably 89% or more, still further more preferably 90% or more, still further more preferably 91% or more, particularly preferably 92% or more.

The molded body of the present invention may be used as an optical member or a transparent member. Specifically, the molded body may be suitably used in at least one selected from, for example, a flexible display, a light guide plate, a housing, a water- or oil-repellent film, an optical adhesive, a switch cover, a heat sealing agent, a water stop material, a sealing agent, a connector, an adapter, a smartphone cover, a lens, a part for a pair of glasses or sunglasses, an optical fiber part, a cushion material for an on-vehicle battery, a wiper blade, a traffic mirror, a side mirror, a rearview mirror, a lamp cover, a bumper, a window, an exterior material, an interior material, an acoustic material, a steering wheel cover, a sensor cover, a watch part, stationery, a cosmetic container, an aquarium for rearing an aquatic organism, a sole, a cup, a nail art material, a toy, a lure, a suction cup, cooking tools including a steamer, clothes, a silicone wiping sheet, a remote controller cover, an umbrella, a metal container lining, a building material cover, a door, a window, a glass interlayer, a tent, a mirror, a shop window case, a plastic greenhouse, a medical equipment housing, a transfusion bag, a transfusion tube, an injection syringe, a feeding bottle, a mask, a face belt, a filter part, a damping part, a robot housing, a drone housing, a shield, a bulletproof shield, a sport cushion, a window for an aircraft, a resin compatibilizer, a lighting cover, a light guide, a light guide panel, a lighting unit, a prism panel, a flat lens, a Fresnel lens, a microlens array, and a collimator lens.

EXAMPLES

The present invention is more specifically described by way of Examples. However, the present invention is by no means limited by these Examples. In each of Examples, characteristic values and evaluation results were determined in the following manner.

(1) Chain Length and Content of Polydimethylsiloxane

The chain length and content of a polydimethylsiloxane were calculated by NMR measurement from the integrated value ratio of a methyl group of the polydimethylsiloxane. In this description, the polydimethylsiloxane is sometimes abbreviated as PDMS.

<Quantification Method for Chain Length of Polydimethylsiloxane>

$^1$H-NMR Measurement Conditions
NMR apparatus: ECA500 manufactured by JEOL Resonance Co., Ltd.
Probe: 50TH5AT/FG2
Observed range: −5 ppm to 15 ppm
Observation center: 5 ppm
Pulse repetition time: 9 sec
Pulse width: 45°
NMR sample tube: 5 φ
Sample amount: 30 mg to 40 mg
Solvent: deuterochloroform
Measurement temperature: room temperature
Number of scans: 256 times
Allylphenol-terminated Polydimethylsiloxane
A: an integrated value of a methyl group in a dimethylsiloxane moiety observed around δ−0.02 to δ 0.5
B: an integrated value of a methylene group in allylphenol observed around δ 2.50 to δ 2.75

Chain length of polydimethylsiloxane=$(A/6)/(B/4)$

Eugenol-terminated Polydimethylsiloxane
A: an integrated value of a methyl group in a dimethylsiloxane moiety observed around δ−0.02 to δ 0.5
B: an integrated value of a methylene group in eugenol observed around δ 2.40 to δ 2.70

Chain length of polydimethylsiloxane=$(A/6)/(B/4)$

<Quantification Method for Content of Polydimethylsiloxane>

Quantification method for the copolymerization amount of a polydimethylsiloxane in a PTBP-terminated polycarbonate obtained by copolymerizing an allylphenol-terminated polydimethylsiloxane
NMR apparatus: ECA500 manufactured by JEOL Resonance Co., Ltd.
Probe: 50TH5AT/FG2
Observed range: −5 ppm to 15 ppm
Observation center: 5 ppm
Pulse repetition time: 9 sec
Pulse width: 45°
Number of scans: 256 times
NMR sample tube: 5 φ
Sample amount: 30 mg to 40 mg
Solvent: deuterochloroform
Measurement temperature: room temperature
A: an integrated value of a methyl group in a BPA moiety observed around δ 1.5 to δ 1.9
B: an integrated value of a methyl group in a dimethylsiloxane moiety observed around δ−0.02 to δ 0.3
C: an integrated value of a butyl group in a p-tert-butylphenyl moiety observed around δ 1.2 to δ 1.4

$a=A/6$ $b=B/6$ $c=C/9$ $T=a+b+c$ $f=a/T\times 100$ $g=b/T\times 100$ $h=c/T\times 100$ $TW=f\times 254+g\times 74.1+h\times 149$ $PDMS\ (\text{wt }\%)=g\times 74.1/TW\times 100$ <Quantification Method for Amount of Block Represented by Formula (III)>

$^{13}$C-NMR Measurement Conditions
NMR apparatus: ECA500 manufactured by JEOL Resonance Co., Ltd.
Probe: C5HPD/FG probe
Observed range: −25 ppm to 225 ppm
Observation center: 100 ppm
Pulse repetition time: 4 sec
Pulse width: 45°
NMR sample tube: 10 φ
Sample amount: 250 mg to 300 mg
Solvent: deuterochloroform
Measurement temperature: room temperature
Number of scans: 10,000 times The amount of a block represented by the formula (III) is calculated from the area A of the signal peak of a carbonate bond of the block represented by the formula (III), the peak being detected at 150.9 ppm with respect to tetramethylsilane (TMS) in a $^{13}$C-NMR chart measured under the above-mentioned conditions, and the area B of a signal peak at 152.1 ppm detected in the chart as a result of the overlapping of the signals of a carbonate bond of a block represented by the formula (I-a) and a block represented by the formula (III-a) by using the calculation expression "A/(A+B)" (unit: mol %).

The quantification lower limit of the quantification method was calculated to be less than 0.1 mol % by the baseline SN ratio of the $^{13}$C-NMR chart:

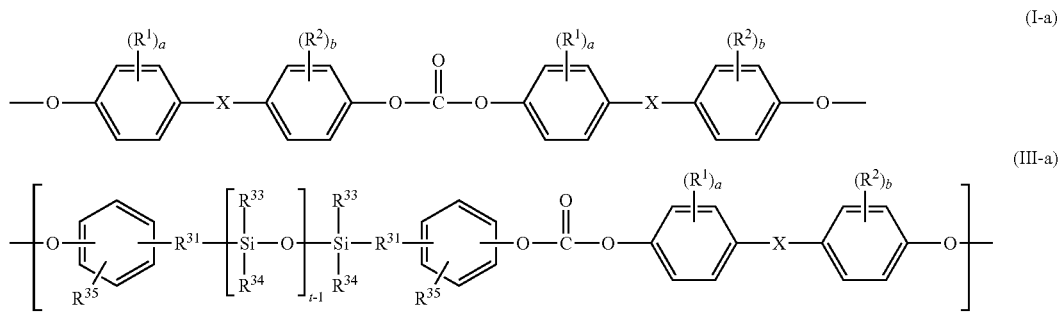

wherein $R^1$, $R^2$, $R^{31}$ to $R^{35}$, X, "a", "b", and "t" are as described above.

(2) Viscosity-Average Molecular Weight

A viscosity-average molecular weight (Mv) was calculated from the following equation (Schnell's equation) by using a limiting viscosity [η] determined through the measurement of the viscosity of a methylene chloride solution at 20° C. with an Ubbelohde-type viscometer.

$$[\eta]=1.23\times10^{-5}\times Mv^{0.83}$$

(3) Weight-Average Molecular Weight and Molecular Weight Distribution

The weight-average molecular weight (Mw) and molecular weight distribution (Mw/Mn) of a PC-POS copolymer were measured with a high-performance GPC apparatus HLC-8220 GPC (manufactured by Tosoh Corporation) under the following conditions, and were calculated on the basis of a general-purpose calibration curve produced by using a molecular weight standard sample.

Column temperature: 40° C.

Column: TSK-GEL GHXL-L, TSK-GEL G4000HXL, and TSK-GEL G2000HXL (manufactured by Tosoh Corporation)

Mobile phase solvent: tetrahydrofuran

Flow rate: 1.0 ml/min

Detector: RI

Injection concentration: 10 mg/10 ml

Injection volume: 0.1 ml

Molecular weight standard sample: Polycarbonate 18,050 (manufactured by Idemitsu Kosan Co., Ltd., molecular weight error: ±5%/17,148 to 18,953) and Polycarbonate 18,100 (manufactured by Idemitsu Kosan Co., Ltd., molecular weight error: ±5%/17,200 to 19,100)

(4) Durometer Hardness

The type A durometer hardness of a molded body was measured with a rubber hardness meter ESA type (manufactured by Elastron, Inc.) and a constant loader EDL-1 (manufactured by Elastron, Inc.) in conformity with JIS K 6253-3:2012 Type A and ISO 7619 Type A under a load of 1 kg.

The type D durometer hardness of a molded body was measured with a rubber hardness meter ESD type (manufactured by Elastron, Inc.) and a constant loader EDL-1 special type (with an oil damper, manufactured by Elastron, Inc.) in conformity with JIS K 6253-3:2012 Type D and ISO 7619 Type D under a load of 5 kg.

(5) Total Light Transmittance

The total light transmittance of a molded body when molded into a thickness of 2 mm was measured with a haze meter NDH 5000 (manufactured by Nippon Denshoku Industries Co., Ltd.) in conformity with JIS K 7361-1:1997.

<Production of Polycarbonate Oligomer>

Sodium dithionite was added in an amount of 2,000 ppm with respect to bisphenol A (BPA) (to be dissolved later) to 5.6 mass % aqueous sodium hydroxide, and then BPA was dissolved in the mixture so that the concentration of BPA was 13.5 mass %. Thus, a solution of BPA in aqueous sodium hydroxide was prepared. The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of the reaction liquid was kept at 40° C. or less by passing cooling water through the jacket. The reaction liquid that had exited the tubular reactor was continuously introduced into a baffled vessel type reactor provided with a sweptback blade and having an internal volume of 40 L. The solution of BPA in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to perform a reaction. An aqueous phase was separated and removed by continuously taking out the reaction liquid overflowing the vessel type reactor and leaving the reaction liquid at rest. Then, a methylene chloride phase was collected.

The polycarbonate oligomer thus obtained had a concentration of 341 g/L and a chloroformate group concentration of 0.71 mol/L.

Production Example 1

185 mL of the polycarbonate oligomer solution (PCO) produced as described above, 445 mL of methylene chloride, 30.3 g of an allylphenol terminal-modified polydimethylsiloxane having an average chain length "n" of 37, and 0.104 mL (0.75 mmol) of triethylamine (TEA) were loaded into a 1-liter separable flask including a baffle board and a mechanical stirrer with a stirring blade. Aqueous sodium hydroxide A (NaOHaq) (sodium hydroxide: 1.9 g (47 mmol), ion-exchanged water: 22 mL) prepared in advance was added to the mixture under stirring to perform a reaction between the polycarbonate oligomer and the allylphenol terminal-modified PDMS for 20 minutes. Next, aqueous sodium hydroxide B [BisP-AP (manufactured by Honshu Chemical Industry Co., Ltd.): 4.8 g (16 mmol), sodium hydroxide: 2.9 g (73 mmol), ion-exchanged water: 42 mL, sodium hyposulfite ($Na_2S_2O_4$): 0.006 g (0.038 mmol)] prepared in advance was further added to the resultant to advance polymerization for 20 minutes.

A solution of p-tert-butylphenol (PTBP: manufactured by DIC Corporation) in methylene chloride [obtained by dissolving 1.5 g (10.0 mmol) of PTBP in 10 mL of methylene chloride] and a solution C of BPA in aqueous sodium hydroxide [obtained by dissolving 7.4 g (26 mmol) of bisphenol A, 5.2 g (131 mmol) of NaOH, and 0.006 g (0.038 mmol) of $Na_2S_2O_4$ in 77 mL of ion-exchanged water] were added to the resultant polymerization liquid to perform a polymerization reaction for 20 minutes.

After the completion of the polymerization, the reaction liquid was transferred to a separating funnel, and was left at rest to be separated into an organic phase and an aqueous phase. After that, the organic layer was transferred to another separating funnel. The organic layer was sequentially washed with 100 mL of 0.03 mol/L aqueous NaOH and 100 mL of 0.2 mol/L hydrochloric acid, and was then repeatedly washed with ion-exchanged water until an electric conductivity in an aqueous phase after the washing became 10 μS/m or less.

The organic layer obtained after the washing was transferred to a vat, and was dried in an explosion-proof dryer (under a nitrogen atmosphere) at 48° C. overnight. Thus, a sheet-shaped PC-POS copolymer was obtained. The sheet-shaped PC-POS copolymer was cut to provide a flaky PC-POS copolymer (a1). Details about the PC-POS copolymer are shown in Table 1-1.

Production Example 2

Production was performed in the same manner as in Production Example 1 except that: the amount of the allylphenol terminal-modified polydimethylsiloxane was changed to 40.4 g; a solution obtained by dissolving 1.9 g (47 mmol) of NaOH in 22 mL of ion-exchanged water was used as the aqueous sodium hydroxide A; a solution obtained by dissolving 4.8 g (20 mmol) of BisP-B, 2.9 g (73 mmol) of NaOH, and 0.031 g (0.20 mmol) of $Na_2S_2O_4$ in 42 mL of ion-exchanged water was used as the aqueous sodium hydroxide B; and a solution obtained by dissolving 3 g (10 mmol) of BPA, 5.2 g (131 mmol) of NaOH, and 0.031 g (0.20 mmol) of $Na_2S_2O_4$ in 77 mL of ion-exchanged water was used as the solution C of BPA in aqueous sodium hydroxide. Thus, a PC-POS copolymer (a6) was obtained. Details about the PC-POS copolymer are shown in Table 1-1.

Production Example 3

Production was performed in the same manner as in Production Example 1 except that: the amount of the allylphenol terminal-modified polydimethylsiloxane was changed to 40.4 g; and a solution obtained by dissolving 3.0 g (10 mmol) of bisphenol A, 5.2 g (131 mmol) of NaOH, and 0.006 g (0.038 mmol) of $Na_2S_2O_4$ in 77 mL of ion-exchanged water was used as the solution C of BPA in aqueous sodium hydroxide. Thus, a PC-POS copolymer (a2) was obtained. Details about the PC-POS copolymer are shown in Table 1-1.

Production Example 4

Production was performed in the same manner as in Production Example 1 except that: 43.0 g of an allylphenol terminal-modified polydimethylsiloxane having an average chain length "n" of 23 was used as an allylphenol terminal-modified polydimethylsiloxane; a solution obtained by dissolving 3.7 g (94 mmol) of NaOH in 43 mL of ion-exchanged water was used as the aqueous sodium hydroxide A; a mixture of 5.5 g (19 mmol) of BisP-AP (manufactured by Honshu Chemical Industry Co., Ltd.), 2.3 g (57 mmol) of NaOH, 33 mL of ion-exchanged water, and 0.031 g (0.196 mmol) of $Na_2S_2O_4$ was used as the aqueous sodium hydroxide B; and a solution obtained by dissolving 2.5 g (8.7 mmol) of bisphenol A, 1.9 g (46.3 mmol) of NaOH, and 0.031 g (0.196 mmol) of $Na_2S_2O_4$ in 27 mL of ion-exchanged water was used as the solution C of BPA in aqueous sodium hydroxide. Thus, a PC-POS copolymer (a10) was obtained. Details about the PC-POS copolymer are shown in Table 1-1.

Production Example 5

Production was performed in the same manner as in Production Example 1 except that: 46.0 g of an allylphenol terminal-modified polydimethylsiloxane having an average chain length "n" of 63 was used as an allylphenol terminal-modified polydimethylsiloxane; a solution obtained by dissolving 2.2 g (55.9 mmol) of NaOH in 26 mL of ion-exchanged water was used as the aqueous sodium hydroxide A; a mixture of 5.8 g (20 mmol) of BisP-AP (manufactured by Honshu Chemical Industry Co., Ltd.), 2.4 g (60 mmol) of NaOH, 35 mL of ion-exchanged water, and 0.031 g (0.196 mmol) of $Na_2S_2O_4$ was used as the aqueous sodium hydroxide B; and a solution obtained by dissolving 6.6 g (22.6 mmol) of bisphenol A, 3.2 g (80.9 mmol) of NaOH, and 0.031 g (0.196 mmol) of $Na_2S_2O_4$ in 47 mL of ion-exchanged water was used as the solution C of BPA in aqueous sodium hydroxide. Thus, a PC-POS copolymer (a14) was obtained. Details about the PC-POS copolymer are shown in Table 1-1.

Production Example 6

Production was performed in the same manner as in Production Example 1 except that: the amount of the allylphenol terminal-modified polydimethylsiloxane was changed to 62.0 g; a solution obtained by dissolving 3.1 g (77 mmol) of NaOH in 35 mL of ion-exchanged water was used as the aqueous sodium hydroxide A; a solution obtained by dissolving 6.0 g (21 mmol) of BisP-AP, 2.5 g (62 mmol) of NaOH, and 0.031 g (0.20 mmol) of $Na_2S_2O_4$ in 36 mL of ion-exchanged water was used as the aqueous sodium hydroxide B; and a solution obtained by dissolving 4.0 g (14 mmol) of bisphenol A, 2.3 g (58 mmol) of NaOH, and 0.031 g (0.20 mmol) of $Na_2S_2O_4$ in 34 mL of ion-exchanged water was used as the solution C of BPA in aqueous sodium hydroxide. Thus, a PC-POS copolymer (a3) was obtained. Details about the PC-POS copolymer are shown in Table 1-1.

Production Example 7

Production was performed in the same manner as in Production Example 1 except that: the amount of the allylphenol terminal-modified polydimethylsiloxane was changed to 77.0 g; a solution obtained by dissolving 3.5 g (87 mmol) of NaOH in 40 mL of ion-exchanged water was used as the aqueous sodium hydroxide A; a solution obtained by dissolving 6.0 g (21 mmol) of BisP-AP, 2.5 g (62 mmol) of NaOH, and 0.031 g (0.20 mmol) of $Na_2S_2O_4$ in 36 mL of ion-exchanged water was used as the aqueous sodium hydroxide B; and a solution obtained by dissolving 2.9 g (10 mmol) of bisphenol A, 1.9 g (48 mmol) of NaOH, and 0.031 g (0.20 mmol) of $Na_2S_2O_4$ in 28 mL of ion-exchanged water was used as the solution C of BPA in aqueous sodium hydroxide. Thus, a PC-POS copolymer (a4) was obtained. Details about the PC-POS copolymer are shown in Table 1-1.

Production Example 8

Production was performed in the same manner as in Production Example 1 except that: the amount of the allylphenol terminal-modified polydimethylsiloxane was changed to 96.0 g; a solution obtained by dissolving 4.0 g (100 mmol) of NaOH in 46 mL of ion-exchanged water was used as the aqueous sodium hydroxide A; a solution obtained by dissolving 7.7 g (27 mmol) of BisP-AP, 4.7 g (118 mmol) of NaOH, and 0.031 g (0.20 mmol) of $Na_2S_2O_4$ in 69 mL of ion-exchanged water was used as the aqueous sodium hydroxide B; and the solution C of BPA in aqueous sodium hydroxide was not added. Thus, a PC-POS copolymer (a5) was obtained. Details about the PC-POS copolymer are shown in Table 1-1.

Production Example 9

Production was performed in the same manner as in Production Example 1 except that: the amount of the allylphenol terminal-modified polydimethylsiloxane was changed to 4.0 g; a solution obtained by dissolving 1.5 g (38 mmol) of NaOH in 18 mL of ion-exchanged water was used as the aqueous sodium hydroxide A; 1.8 g (12.0 mmol) of PTBP was used; a solution obtained by dissolving 13.2 g (45 mmol) of bisphenol A, 6.3 g (159 mmol) of NaOH, and 0.031 g (0.20 mmol) of $Na_2S_2O_4$ in 93 mL of ion-exchanged water was used as the solution C of BPA in aqueous sodium hydroxide; and the aqueous sodium hydroxide B was not loaded. Thus, a PC-POS copolymer (a9) was obtained. Details about the PC-POS copolymer are shown in Table 1-2.

Production Example 10

Production was performed in the same manner as in Production Example 1 except that: the amount of the allylphenol terminal-modified polydimethylsiloxane was changed to 23.0 g; a solution obtained by dissolving 2.0 g (50.8 mmol) of NaOH in 23 mL of ion-exchanged water was used as the aqueous sodium hydroxide A; 1.8 g (12.0 mmol) of PTBP was used; a solution obtained by dissolving 11.7 g (40.4 mmol) of bisphenol A, 5.8 g (146.0 mmol) of NaOH, and 0.031 g (0.20 mmol) of $Na_2S_2O_4$ in 85 mL of ion-exchanged water was used as the solution C of BPA in aqueous sodium hydroxide; and the aqueous sodium hydroxide B was not loaded. Thus, a PC-POS copolymer (a12) was obtained. Details about the PC-POS copolymer are shown in Table 1-2.

Production Example 11

Production was performed in the same manner as in Production Example 1 except that: 30.0 g of an allylphenol terminal-modified polydimethylsiloxane having an average chain length "n" of 63 was used as an allylphenol terminal-modified polydimethylsiloxane; a solution obtained by dissolving 1.8 g (45 mmol) of NaOH in 21 mL of ion-exchanged water was used as the aqueous sodium hydroxide A; 1.8 g (12.0 mmol) of PTBP was used; a solution obtained by dissolving 12.3 g (43 mmol) of bisphenol A, 6.1 g (151 mmol) of NaOH, and 0.031 g (0.20 mmol) of $Na_2S_2O_4$ in 89 mL of ion-exchanged water was used as the solution C of BPA in aqueous sodium hydroxide; and the aqueous sodium hydroxide B was not loaded. Thus, a PC-POS copolymer (a8) was obtained. Details about the PC-POS copolymer are shown in Table 1-2.

Production Example 12

Production was performed in the same manner as in Production Example 1 except that: the amount of the allylphenol terminal-modified polydimethylsiloxane was changed to 55 g; a solution obtained by dissolving 2.9 g (72.1 mmol) of NaOH in 33 mL of ion-exchanged water was used as the aqueous sodium hydroxide A; 1.8 g (12.0 mmol) of PTBP was used; a solution obtained by dissolving 9.3 g (32.0 mmol) of bisphenol A, 5.0 g (124.7 mmol) of NaOH, and 0.031 g (0.20 mmol) of $Na_2S_2O_4$ in 73 mL of ion-exchanged water was used as the solution C of BPA in aqueous sodium hydroxide; and the aqueous sodium hydroxide B was not loaded. Thus, a PC-POS copolymer (a13) was obtained. Details about the PC-POS copolymer are shown in Table 1-2.

Production Example 13

Production was performed in the same manner as in Production Example 1 except that: the amount of the allylphenol terminal-modified polydimethylsiloxane was changed to 78.0 g; a solution obtained by dissolving 3.5 g (87 mmol) of NaOH in 40 mL of ion-exchanged water was used as the aqueous sodium hydroxide A; 1.8 g (12.0 mmol) of PTBP was used; a solution obtained by dissolving 7.5 g (26 mmol) of bisphenol A, 4.4 g (109 mmol) of NaOH, and 0.031 g (0.20 mmol) of $Na_2S_2O_4$ in 70 mL of ion-exchanged water was used as the solution C of BPA in aqueous sodium hydroxide; and the aqueous sodium hydroxide B was not loaded. Thus, a PC-POS copolymer (a7) was obtained. Details about the PC-POS copolymer are shown in Table 1-2.

TABLE 1-1

| | | Production Example | | | | | | | |
|---|---|---|---|---|---|---|---|---|---|
| | | 1 | 2 | 3 | 4 | 5 | 6 | 7 | 8 |
| Amount of PDMS in PC-POS copolymer (A) | mass % | 32 | 39 | 40 | 41 | 42 | 50 | 56 | 62 |
| Amount of BPA block in PC block (A-1)*[1] | mass % | 92.4 | 92.3 | 92.2 | 92.8 | 90.0 | 90.9 | 93.3 | 95.0 |
| PC block (A-1) except BPA*[2] | | BisP-AP | BisP-B | BisP-AP | BisP-AP | BisP-AP | BisP-AP | BisP-AP | BisP-AP |
| Amount of PC block except BPA in PC-POS copolymer (A)*[2] | mass % | 5 | 5 | 5 | 4 | 5 | 5 | 3 | 2 |

TABLE 1-1-continued

|  |  | Production Example | | | | | | | |
|---|---|---|---|---|---|---|---|---|---|
|  |  | 1 | 2 | 3 | 4 | 5 | 6 | 7 | 8 |
| Amount of block represented by formula (III) in PC-POS copolymer (A) | mol % | <0.1 | <0.1 | <0.1 | <0.1 | <0.1 | <0.1 | <0.1 | <0.1 |
| PDMS chain length |  | 37 | 37 | 37 | 23 | 63 | 37 | 37 | 37 |
| Mv |  | 22,500 | 20,200 | 20,000 | 17,900 | 20,500 | 19,200 | 18,300 | 19,400 |
| Mw |  | — | — | 28,000 | — | — | — | — | 34,400 |
| Molecular weight distribution (Mw/Mn) |  | — | — | 2.5 | — | — | — | — | 2.8 |
| PC-POS copolymer |  | a1 | a6 | a2 | a10 | a14 | a3 | a4 | a5 |

*[1] BPA block: the term represents a PC block derived from BPA.
*[2] PC block except BPA: the term represents a PC block derived from a dihydric phenol except BPA.

TABLE 1-2

|  |  | Production Example | | | | |
|---|---|---|---|---|---|---|
|  |  | 9 | 10 | 11 | 12 | 13 |
| Amount of PDMS in PC-POS copolymer (A) | mass % | 6 | 25 | 30 | 45 | 55 |
| Amount of BPA block in PC block (A-1)*[1] | mass % | 100 | 100 | 100 | 100 | 100 |
| Amount of PC block except BPA in PC-POS copolymer (A)*[2] | mass % | — | — | — | — | — |
| Amount of block represented by formula (III) in PC-POS copolymer (A) | mol % | <0.1 | <0.1 | <0.1 | <0.1 | <0.1 |
| PDMS chain length |  | 37 | 37 | 63 | 37 | 37 |
| Mv |  | 17,700 | 17,600 | 17,600 | 17,500 | 16,500 |
| Mw |  | — | 20,700 | 21,000 | 24,700 | 36,700 |
| Molecular weight distribution (Mw/Mn) |  | — | 2.3 | 2.4 | 2.6 | 2.9 |
| PC-POS copolymer |  | a9 | a12 | a8 | a13 | a7 |

*[1] BPA block: the term represents a PC block derived from BPA.
*[2] PC block except BPA: the term represents a PC block derived from a dihydric phenol except BPA.

Examples 1 to 12 and Comparative Example 1

Each of the PC-POS copolymers obtained in the respective production examples was molded with a vacuum press machine (manufactured by Imoto Machinery Co., Ltd., manual hydraulic vacuum heat press machine). 7.0 g of the resin was loaded into a mold measuring 5 cm long by 5 cm wide by 2 mm thick, and a mirror-finished aluminum plate was brought into contact with the surface of the resin to sandwich the resin between the plate and the mold. The resultant was loaded into the vacuum press machine, and a pressure in the tank of the vacuum press machine was reduced to −0.1 MPa or less with respect to atmospheric pressure. After that, the resin was heated to a molding temperature shown in each of Table 2-1 and Table 2-2. After the temperature of the resin had reached the molding temperature, a press pressure was set to 2 MPa, and then the resin was heated for 2 minutes. Subsequently, the press pressure was increased over 3 minutes, and the molding was performed for 5 minutes while the pressure was maintained at 15 MPa. After the molding, the pressure in the tank was returned to atmospheric pressure, and then the molded body was removed and cooled to room temperature. After that, the molded body was peeled from the mirror-finished aluminum plate to provide a sample for measurement measuring 5 cm long by 5 cm wide by 2 mm thick. The evaluation results of the PC-POS copolymers are shown in Table 2-1 and Table 2-2.

TABLE 2-1

|  | Example | | | | | | | |
|---|---|---|---|---|---|---|---|---|
|  | 1 | 2 | 3 | 4 | 5 | 6 | 7 | 8 |
| PC-POS copolymer | a1 | a6 | a2 | a10 | a14 | a3 | a4 | a5 |
| Molding temperature of sample for durometer hardness measurement (° C.) | 280 | 280 | 280 | 280 | 280 | 280 | 280 | 280 |
| Durometer hardness Type D | 67 | 62 | 63 | 60 | 51 | 47 | 33 | 29 |
| Durometer hardness Type A | 95< | 95< | 95< | 95< | 95< | 95< | 85 | 78 |
| Molding temperature of sample for total light transmittance measurement (° C.) | 180 | 180 | 180 | 230 | 230 | 180 | 180 | 180 |

TABLE 2-1-continued

| | Example | | | | | | | |
|---|---|---|---|---|---|---|---|---|
| | 1 | 2 | 3 | 4 | 5 | 6 | 7 | 8 |
| Total light transmittance (%) | 90.0 | 90.1 | 90.8 | 91.2 | 81.2 | 91.4 | 91.2 | 91.7 |

TABLE 2-2

| | Example | | | | Comparative Example |
|---|---|---|---|---|---|
| | 9 | 10 | 11 | 12 | 1 |
| PC-POS copolymer | a12 | a8 | a13 | a7 | a9 |
| Molding temperature of sample for durometer hardness measurement (° C.) | 280 | 280 | 280 | 280 | 280 |
| Durometer hardness Type D | 71 | 63 | 57 | 28 | 74 |
| Durometer hardness Type A | 95< | 95< | 95< | 74 | 95< |
| Molding temperature of sample for total light transmittance measurement (° C.) | 280 | 320 | 280 | 280 | 180 |
| Total light transmittance (%) | 90.3 | 78.3 | 90.9 | 92.3 | 88.9 |

INDUSTRIAL APPLICABILITY

According to the present invention, the molded body having both of excellent flexibility and transparency can be obtained. The molded body of the present invention may be used as an optical transparent member. Specifically, the molded body may be suitably used in at least one selected from, for example, a flexible display, a light guide plate, a housing, a water- or oil-repellent film, an optical adhesive, a switch cover, a heat sealing agent, a water stop material, a sealing agent, a connector, an adapter, a smartphone cover, a lens, a part for a pair of glasses or sunglasses, an optical fiber part, a cushion material for an on-vehicle battery, a wiper blade, a traffic mirror, a side mirror, a rearview mirror, a lamp cover, a bumper, a window, an exterior material, an interior material, an acoustic material, a steering wheel cover, a sensor cover, a watch part, stationery, a cosmetic container, an aquarium for rearing an aquatic organism, a sole, a cup, a nail art material, a toy, a lure, a suction cup, cooking tools including a steamer, clothes, a silicone wiping sheet, a remote controller cover, an umbrella, a metal container lining, a building material cover, a door, a window, a glass interlayer, a tent, a mirror, a shop window case, a plastic greenhouse, a medical equipment housing, a transfusion bag, a transfusion tube, an injection syringe, a feeding bottle, a mask, a face belt, a filter part, a damping part, a robot housing, a drone housing, a shield, a bulletproof shield, a sport cushion, a window for an aircraft, a resin compatibilizer, a lighting cover, a light guide, a light guide panel, a lighting unit, a prism panel, a flat lens, a Fresnel lens, a microlens array, and a collimator lens.

The invention claimed is:

1. A molded body, comprising a polycarbonate-polyorganosiloxane copolymer (A) which contains a polycarbonate block (A-1) formed of a repeating unit represented by the following general formula (I) and a polyorganosiloxane block (A-2) containing a repeating unit represented by the following general formula (II), and in which a content of the polyorganosiloxane block (A-2) is from 20 mass % or more to 70 mass % or less, wherein the polycarbonate-polyorganosiloxane copolymer (A) is the only polymer in the molded body;

the polycarbonate-polyorganosiloxane copolymer (A) has a molecular weight distribution of from 2.1 or more to 3.5 or less, wherein the molded body has a durometer hardness of from 40 or more to 72 or less measured with a type D durometer in conformity with JIS K 6253-3:2012:

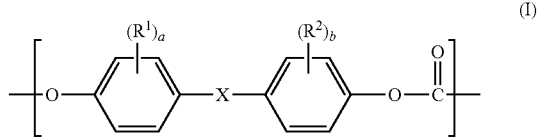

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —$SO_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

2. The molded body according to claim 1, wherein a content of a unit represented by the following general formula (III) in the polyorganosiloxane block (A-2) is 0.1 mol % or less:

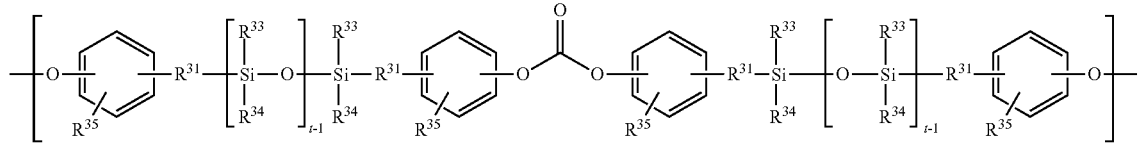

(III)

wherein $R^{33}$ and $R^{34}$ each independently represent a hydrogen atom, a halogen atom, an alkyl group having 1 to 6 carbon atoms, an alkoxy group having 1 to 6 carbon atoms, or an aryl group having 6 to 12 carbon atoms, $R^{31}$ represents an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, an arylene group having 6 to 12 carbon atoms, a fluorenediyl group, an arylalkylene group having 7 to 15 carbon atoms, or an arylalkylidene group having 7 to 15 carbon atoms, $R^{35}$ represents a hydrogen atom, a halogen atom, an alkyl group having 1 to 6 carbon atoms, an alkoxy group having 1 to 6 carbon atoms, or an aryl group having 6 to 12 carbon atoms, and "t" represents an average chain length of a polyorganosiloxane.

3. The molded body according to claim 1, wherein the polyorganosiloxane block (A-2) has a number of repetitions of from 10 or more to less than 90.

4. The molded body according to claim 1, wherein the polyorganosiloxane block (A-2) contains a unit represented by at least one of the following general formula (II-I), (II-II), or (II-III):

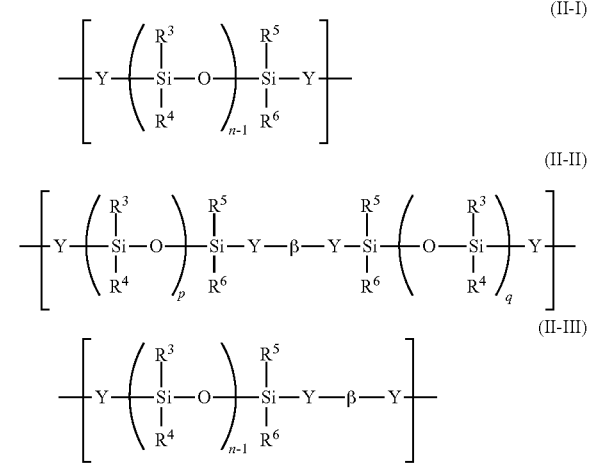

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$s, $R^4$s, $R^5$s, or $R^6$s may be identical to or different from each other, Y represents —$R^7$O—, —$R^7$COO—, —$R^7$NR$^8$—, —COO—, —S—, —$R^7$COO—$R^9$—O—, or —$R^7$O—$R^{10}$—O—, and a plurality of Ys may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, "n" represents a chain length of a polyorganosiloxane, and n−1, and "p" and "q" each represent a number of repetitions of a polyorganosiloxane unit and each represent an integer of 1 or more, and a sum of "p" and "q" is n−2.

5. The molded body according to claim 1, wherein the polyorganosiloxane block (A-2) is represented by the following general formula (V):

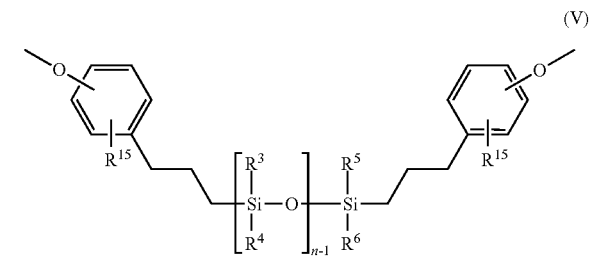

wherein $R^3$ to $R^6$ and n−1 are the same as those described in the general formulae (II-I) to (II-III), and $R^{15}$ represents a hydrogen atom, a halogen atom, an alkyl group having 1 to 6 carbon atoms, an alkoxy group having 1 to 6 carbon atoms, or an aryl group having 6 to 12 carbon atoms.

6. The molded body according to claim 1, wherein the polycarbonate-polyorganosiloxane copolymer (A) has a viscosity-average molecular weight of from 10,000 or more to 23,000 or less.

7. The molded body according to claim 1, wherein the molded body has a total light transmittance of 75% or more measured in conformity with JIS K 7361-1:1997 when molded into a thickness of 2 mm.

8. The molded body according to claim 1, wherein the molded body is an optical member.

9. The molded body according to claim 1, wherein the molded body is at least one selected from a flexible display, a light guide plate, a housing, a water- or oil-repellent film, an optical adhesive, a switch cover, a heat sealing agent, a water stop material, a sealing agent, a connector, an adapter, a smartphone cover, a lens, a part for a pair of glasses or sunglasses, an optical fiber part, a cushion material for an on-vehicle battery, a wiper blade, a traffic mirror, a side mirror, a rearview mirror, a lamp cover, a bumper, a window, an exterior material, an interior material, an acoustic material, a steering wheel cover, a sensor cover, a watch part, stationery, a cosmetic container, an aquarium for rearing an aquatic organism, a sole, a cup, a nail art material, a toy, a lure, a suction cup, cooking tools including a steamer, clothes, a silicone wiping sheet, a remote controller cover, an umbrella, a metal container lining, a building material cover, a door, a window, a glass interlayer, a tent, a mirror, a shop window case, a plastic greenhouse, a medical equipment housing, a transfusion bag, a transfusion tube, an injection syringe, a feeding bottle, a mask, a face belt, a filter part, a damping part, a robot housing, a drone housing, a shield, a bulletproof shield, a sport cushion, a window for an aircraft, a resin compatibilizer, a lighting cover, a light guide, a light guide panel, a lighting unit, a prism panel, a flat lens, a Fresnel lens, a microlens array, and a collimator lens.

* * * * *

UNITED STATES PATENT AND TRADEMARK OFFICE
CERTIFICATE OF CORRECTION

PATENT NO. : 11,655,326 B2
APPLICATION NO. : 16/955996
DATED : May 23, 2023
INVENTOR(S) : Kazushige Ideta, Hirotoshi Ishii and Yasuhiro Ishikawa It is certified that error appears in the above-identified patent and that said Letters Patent is hereby corrected as shown below:

In the Claims

Claim 4, at Column 35, Line 63, should read as: "Y represents -R7O-, -R7COO-, -R7NH-, -R7NR8-, -COO-, -S-,"

Signed and Sealed this
Fifth Day of September, 2023

Katherine Kelly Vidal
*Director of the United States Patent and Trademark Office*